United States Patent
Alarifi et al.

(10) Patent No.: US 11,905,467 B2
(45) Date of Patent: Feb. 20, 2024

(54) PROCESS FOR CATALYTIC CRACKING OF NAPHTHA USING MULTI-STAGE RADIAL FLOW MOVING BED REACTOR SYSTEM

(71) Applicant: SABIC Global Technologies B.V., Bergen op Zoom (NL)

(72) Inventors: Abdulaziz A. Alarifi, Riyadh (SA); Khalid A. Al-Majnouni, Riyadh (SA); Ahmed Al-Zenaidi, Riyadh (SA); Nandini Pechimuthu, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/267,576

(22) PCT Filed: Jul. 2, 2019

(86) PCT No.: PCT/IB2019/055646
§ 371 (c)(1),
(2) Date: Feb. 10, 2021

(87) PCT Pub. No.: WO2020/049372
PCT Pub. Date: Mar. 12, 2020

(65) Prior Publication Data
US 2021/0309921 A1  Oct. 7, 2021

Related U.S. Application Data

(60) Provisional application No. 62/727,978, filed on Sep. 6, 2018.

(51) Int. Cl.
*C10G 11/16* (2006.01)
*B01J 8/00* (2006.01)
(Continued)

(52) U.S. Cl.
CPC ............... *C10G 11/16* (2013.01); *B01J 8/003* (2013.01); *B01J 8/12* (2013.01); *C10G 51/026* (2013.01);
(Continued)

(58) Field of Classification Search
CPC .. C10G 11/16; C10G 51/026; C10G 2400/20; C10G 2300/802; C10G 2300/805;
(Continued)

(56) References Cited

U.S. PATENT DOCUMENTS 3,706,536 A  12/1972  Greenwood et al.
4,102,776 A   7/1978  Stone
(Continued)

FOREIGN PATENT DOCUMENTS

CA      2014153    *  9/1990
CN    101029250 A     9/2007
(Continued)

OTHER PUBLICATIONS

"Unconventional Catalytic Olefins Production: Commercial Vision and Breakout?" The Catalyst Group Resources, 19 Pages, 2013.
(Continued)

*Primary Examiner* — Prem C Singh
*Assistant Examiner* — Brandi M Doyle
(74) *Attorney, Agent, or Firm* — Norton Rose Fulbright US LLP (57) ABSTRACT

System and method for producing olefins are disclosed. The method includes using a radial flow moving bed reactor system to catalytically crack paraffins, in multiple stages with continuous catalyst regeneration, to form olefins. The system includes inter-stage heaters to facilitate increase in yield of olefins.

8 Claims, 7 Drawing Sheets

(51) Int. Cl.
*B01J 8/12* (2006.01)
*C10G 51/02* (2006.01)

(52) U.S. Cl.
CPC ........... *B01J 2208/00938* (2013.01); *C10G 2300/1044* (2013.01); *C10G 2300/4006* (2013.01); *C10G 2300/4012* (2013.01); *C10G 2300/4018* (2013.01); *C10G 2300/4025* (2013.01); *C10G 2300/802* (2013.01); *C10G 2300/805* (2013.01); *C10G 2400/20* (2013.01)

(58) Field of Classification Search
CPC .... C10G 2300/4006; C10G 2300/4012; C10G 2300/4018; C10G 2300/4025; C10G 2300/1044; B01J 8/003; B01J 8/12; B01J 2208/00938
See application file for complete search history.

(56) References Cited

U.S. PATENT DOCUMENTS

| | | | |
|---|---|---|---|
| 4,110,081 A * | 8/1978 | Millar | B01J 8/003 422/219 |
| 4,830,728 A | 5/1989 | Herbst et al. | |
| 5,318,696 A * | 6/1994 | Kowalski | C10G 11/05 208/120.25 |
| 6,437,208 B1 | 8/2002 | Kuechler et al. | |
| 8,293,961 B2 | 10/2012 | Choi et al. | |
| 8,324,441 B2 | 12/2012 | Wegerer et al. | |
| 2001/0056217 A1 | 12/2001 | Froment et al. | |
| 2005/0096492 A1 | 5/2005 | Dath et al. | |
| 2009/0110616 A1 | 4/2009 | Yuan | |
| 2010/0087693 A1 | 4/2010 | Kalnes et al. | |
| 2011/0152591 A1 | 6/2011 | Sadler et al. | |
| 2011/0240523 A1 * | 10/2011 | Mandal | C10G 11/18 208/120.01 |
| 2013/0338418 A1 | 12/2013 | Xu et al. | |
| 2017/0173549 A1 | 6/2017 | Bazer-Bachi et al. | |
| 2018/0179455 A1 * | 6/2018 | Frey | C10G 63/04 |

FOREIGN PATENT DOCUMENTS

| | | |
|---|---|---|
| CN | 100554229 C | 12/2007 |
| CN | 100392047 C | 6/2008 |
| CN | 102746081 B | 11/2014 |
| CN | 110603311 A | 12/2019 |
| EP | 2660288 A1 | 11/2013 |
| JP | H10251664 A | 9/1998 |
| WO | WO2002028987 A1 | 4/2002 |
| WO | WO2006098712 A1 | 9/2006 |
| WO | WO2006124175 | 11/2006 |
| WO | WO2008008527 | 1/2008 |
| WO | WO2013016660 A1 | 1/2013 |
| WO | WO2018109639 A1 | 6/2018 |

OTHER PUBLICATIONS

Bayat et al. "Enhanced olefin production Via a novel radial-flow membrane reactor of heavy paraffin dehydrogenation in LAB plant." Journal of the Taiwan Institute of Chemical Engineers 45 (2014) 2906-2919.
Bulatov et al., "FCC Process of Heavy Feed Stock with Improved Yield of Light Olefins", Oil and Gas Business, 10 pages, 2009.
Gary, J. H. et al. (2007) Petroleum Refining Technology and Economics, $5^{th}$ edition, Taylor & Francis, section 17.10, 24 pages.
International Search Report and Written Opinion from PCT/IB2018/051672 dated May 17, 2018, 9 pages.
International Search Report and Written Opinion from PCT/IB2019/055646 dated Sep. 25, 2019, 10 pages.
"Regeneration of Catalyst", Industrial Chemistry Compilation Group of Teachers College, Industrial Chemistry, Jun. 30, 1956, p. 536, English Translation.

* cited by examiner

PROCESS FOR CATALYTIC CRACKING OF NAPHTHA USING MULTI-STAGE RADIAL FLOW MOVING BED REACTOR SYSTEM

CROSS REFERENCE TO RELATED APPLICATIONS

This application is a national phase application under 35 U.S.C. § 371 of International Application No. PCT/IB2019/055646 filed Jul. 2, 2019, which claims priority to U.S. Provisional Patent Application No. 62/727,978 filed Sep. 6, 2018. The entire contents of each of the above-referenced disclosures is specifically incorporated by reference herein without disclaimer.

FIELD OF INVENTION

The present invention generally relates to the production of olefins. More specifically, the present invention relates to the production of olefins by cracking a hydrocarbon feed using a multi-stage radial flow moving bed reactor system.

BACKGROUND OF THE INVENTION

Olefins (alkenes), unsaturated hydrocarbon compounds having at least one double bond between carbon atoms, are widely used as raw material in producing a variety of chemicals. Industrial methods for producing olefins include cracking of paraffins (alkanes) (open chained saturated hydrocarbons) and catalytic dehydrogenation of paraffins. Naphtha and natural gas are sources of paraffinic hydrocarbons that can be used as raw materials to produce olefins. The conversion of paraffinic hydrocarbons having end point less than 350° C. into light olefins ($C_2$ to $C_4$ olefins) by catalytic cracking with high selectively and yields has been challenging from a process configuration standpoint and from a catalyst design standpoint. The conversion of these hydrocarbons requires high temperature (above 600° C.) and relatively short residence time to overcome the endothermicity of the catalytic cracking reactions and prevent oligomerization of light olefins. In addition, undesirable side reactions can be facilitated by high pressure, which is also a typical condition of the catalytic cracking conversion process.

Some processes use fixed bed reactors to carry out the catalytic cracking of paraffins to form olefins. However, the reactors have to be shut down to reactivate (regenerate) the catalyst to restore its initial activity.

Other processes use fluidized bed reactors to carry out the catalytic cracking of paraffins to form olefins. A commercial process for converting naphtha feed into light olefins, jointly developed by KBR and SK cooperation, is known. The process is called Advanced Catalytic Olefins (K-COT). It is based on a fluid catalytic cracking process where catalysts are circulated between reactor and regenerator. This is an ideal process when catalyst loses activity (deactivates) rapidly. This process requires an additional supplement of fuel to maintain the energy balance because the amount of coke is not enough to sustain the conversion at a desirable level. Further, the process requires high catalyst/oil ratio in order to achieve acceptable yields.

BRIEF SUMMARY OF THE INVENTION

A method has been discovered for producing olefins by catalytically cracking paraffinic feedstock such as naphtha using a multi-stage moving bed reactor system. With the moving bed reactor system, the method can operate at low pressure and short residence time, thus, undesirable side reactions can be minimized. The paraffinic feedstock can be introduced in the reactor(s), either radially inwardly or radially outwardly through the moving bed while catalyst is introduced at the top of the reactor(s) and is allowed to move continuously downward toward the bottom of the reactor(s), from which the catalyst is removed and sent to be regenerated in a regenerator. The catalytic cracking can be done in multiple stages using reactors in series with inter stage heating of the effluent from a reactor so that the effluent feeds into the next reactor at a desired temperature and inter-stage regeneration of catalyst.

The discovered method facilitates continuous mode of operation, unlike fixed bed reactors where shutdown is required to reactivate (regenerate) the catalyst to restore its initial activity and provide high production capacity without increased pressure drop or increased vessel size.

Embodiments of the invention include a method of producing olefins that includes providing a first reactor that comprises a first shell and a first moving catalyst bed within the first shell of the first reactor, where the first moving catalyst bed is formed by flowing catalyst particles to an upper portion of a first perforated container within the first shell of the first reactor so that the catalyst particles flow downward from the upper portion of the first perforated container, by gravity, to a lower portion of the first perforated container and then flow out of the first reactor to a catalyst regenerator. The method further includes flowing a liquid hydrocarbon feed into a first region within the first reactor, from which the liquid hydrocarbon feed flows radially through a first perforated wall of the first perforated container, then through the first moving catalyst bed, thereby providing contact of the liquid hydrocarbon feed with the catalyst particles of the first moving catalyst bed. The method further includes, as a result of the contact, catalytically cracking the liquid hydrocarbon feed under first reaction conditions sufficient to form olefins. The method also includes flowing a stream comprising the formed olefins from the first moving catalyst bed through a second perforated wall of the first perforated container and into a second region within the first shell. The method then includes flowing effluent from the second region within the shell to a first heater located outside of the first reactor. The method further includes heating the first effluent in the first heater, flowing the heated first effluent to a second reactor, and catalytically cracking the heated effluent in the second reactor under second reaction conditions sufficient to form additional olefins.

Embodiments of the invention include a multi-stage reactor system that comprises a catalyst regenerator system and a first reactor. The first reactor includes a shell, an inlet adapted to receive a liquid hydrocarbon feed, a first inlet adapted to receive first catalyst particles; a first perforated container within the shell of the first reactor, wherein the inlet adapted to receive the first catalyst particles leads to an upper portion of the first perforated container, and a first region adjacent a first wall of the first perforated container and a second region adjacent a second wall of the first perforated container. The first reactor further includes a first moving catalyst bed within the first perforated container, where the inlet adapted to receive the liquid hydrocarbon feed leads into the first region such that the liquid hydrocarbon feed flows radially through the first perforated wall of the first perforated container into the first moving catalyst bed, and then cracked product flows through the second wall of the first perforated container into the second region. The first reactor also includes an outlet adapted to allow the flow of the cracked product from the second region to outside the shell and an outlet adapted to receive the first catalyst particles from a lower portion of the first perforated container as the first catalyst particles flow downward from the upper portion of the first perforated container, by gravity. The multi-stage reactor system further includes a first connector connecting the outlet adapted to receive the first catalyst particles from the lower portion of the first perforated container to an inlet of the catalyst regenerator system. The multi-stage reactor system also includes a first heater, a second reactor, a second connector adapted to provide fluid communication between the outlet adapted to allow the flow of cracked product from the second region and the first heater, and a third connector adapted to provide fluid communication between the first heater and the second reactor.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %," "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

A method has been discovered for producing olefins using a multi-stage moving bed reactor system. The multi-stage moving bed reactor system, according to embodiments of the invention, is adapted to catalytically crack paraffinic feedstock such as naphtha. In particular, the present invention can be used for catalytically cracking liquid hydrocarbons having end point less than 350° C. The paraffinic feedstock can be introduced in a first reactor, either radially inwardly or radially outwardly through a moving bed in the first reactor while catalyst is introduced at the top of the first reactor and is allowed to move continuously downward toward the bottom of the first reactor, from which the catalyst is removed and sent to be regenerated in a catalyst regenerator. The first reactor is operated at reaction conditions sufficient to cause paraffins in the paraffinic feedstock to be catalytically cracked to form olefins.

The first reactor effluent can then be heated to a desired temperature and the heated first reactor effluent can be introduced in a second reactor, either radially inwardly or radially outwardly through the moving bed in the second reactor, similar to the case of the first reactor. The second reactor has catalyst moving down through it, as in the first reactor, to form a moving bed in the second reactor. The second reactor is at reaction conditions sufficient to cause paraffins in the first reactor effluent to be catalytically cracked to form olefins. The catalyst from the bottom of the second reactor can be removed and sent to be regenerated in the same or different catalyst regenerator mentioned for the first reactor. The effluent from the second reactor can be heated to a desired temperature prior to being supplied as feed for a third reactor. This process can be repeated in any desired number of reactors (e.g., 1, 2, 3, 4, 5, or 6) of the multiple stage reactor system to form olefins. In this way, according to embodiments of the invention, different catalysts and different regenerators can be used for different stages under different conditions, although the same catalyst and regenerator can be used for all stages and the conditions for the stages can be the same. According to embodiments of the invention, there is continuous regeneration of catalyst at each stage.

Figure 1:
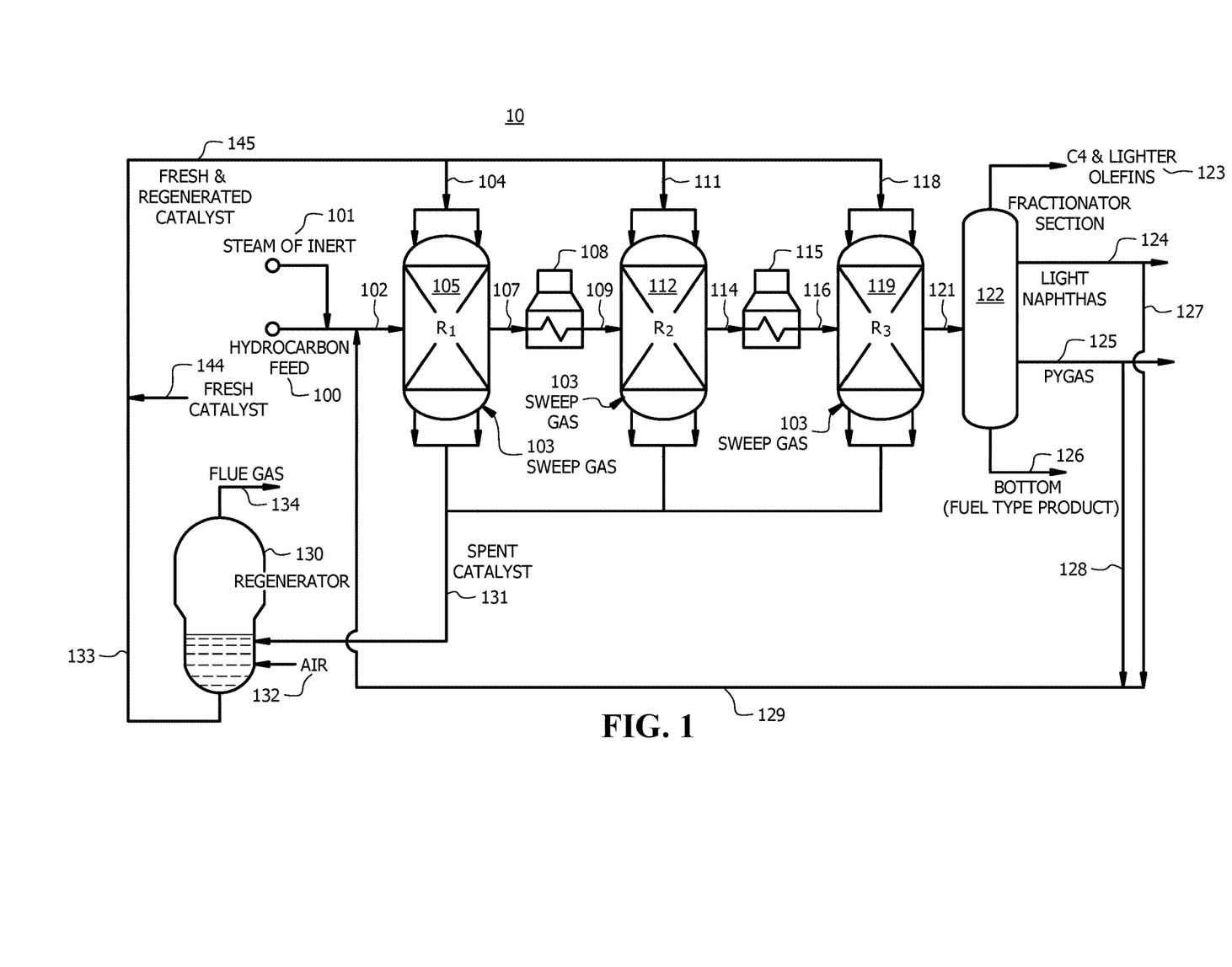
FIG. 1 shows a multi-stage reactor system for producing olefins, according to embodiments of the invention.
Figure 2A:
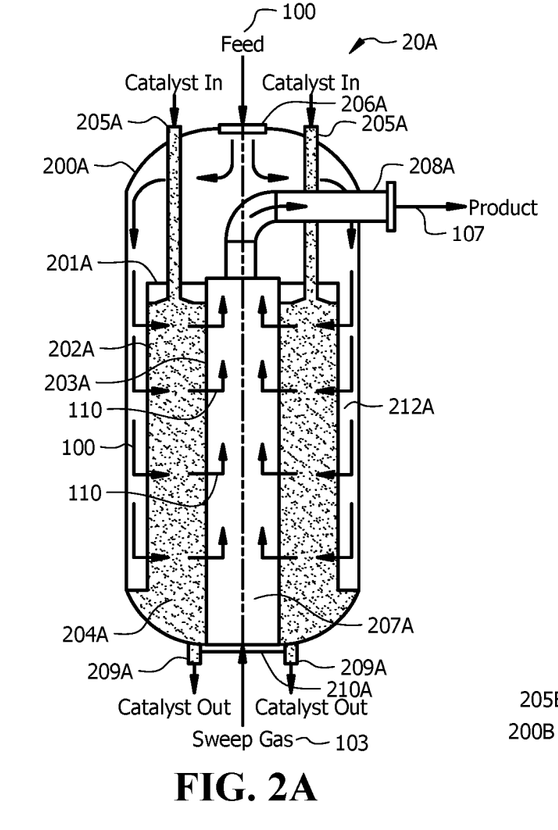
FIG. 2A and FIG. 2B show radial flow moving bed reactors for producing olefins, according to embodiments of the invention.
Figure 2B:
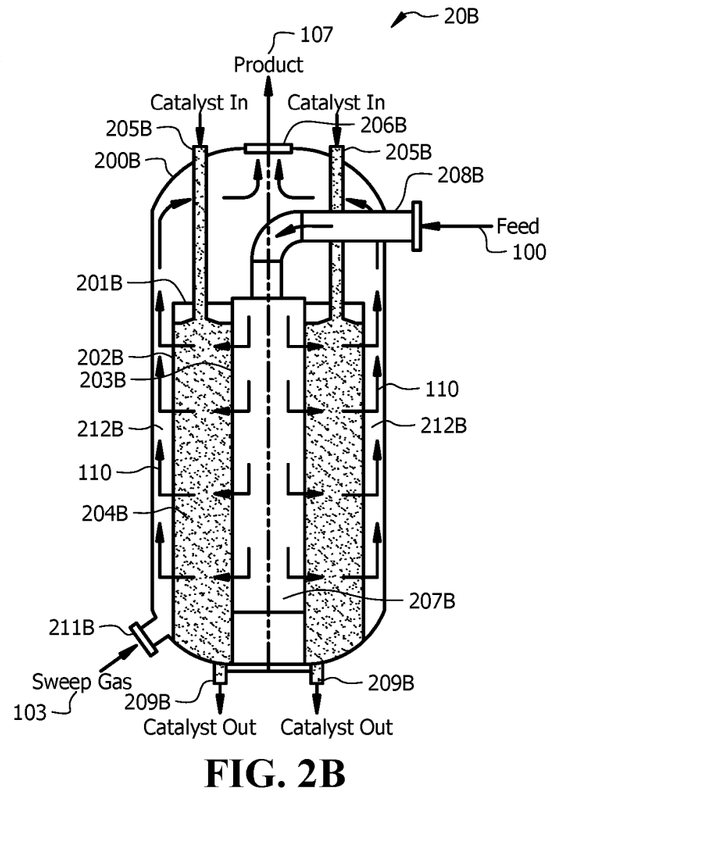
Figure 3A:
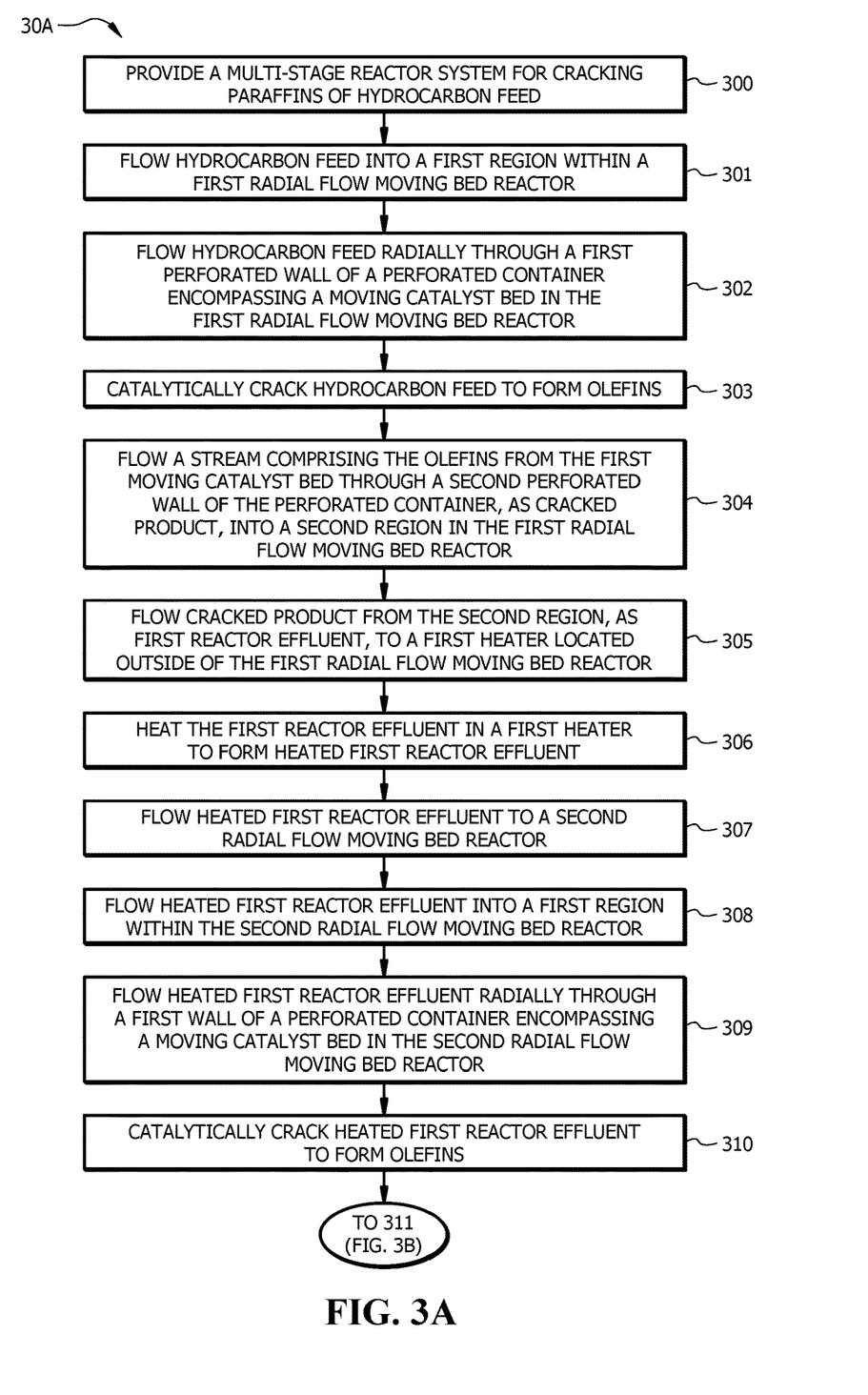
FIG. 3A and FIG. 3B show a method for producing olefins, according to embodiments of the invention.
Figure 3B:
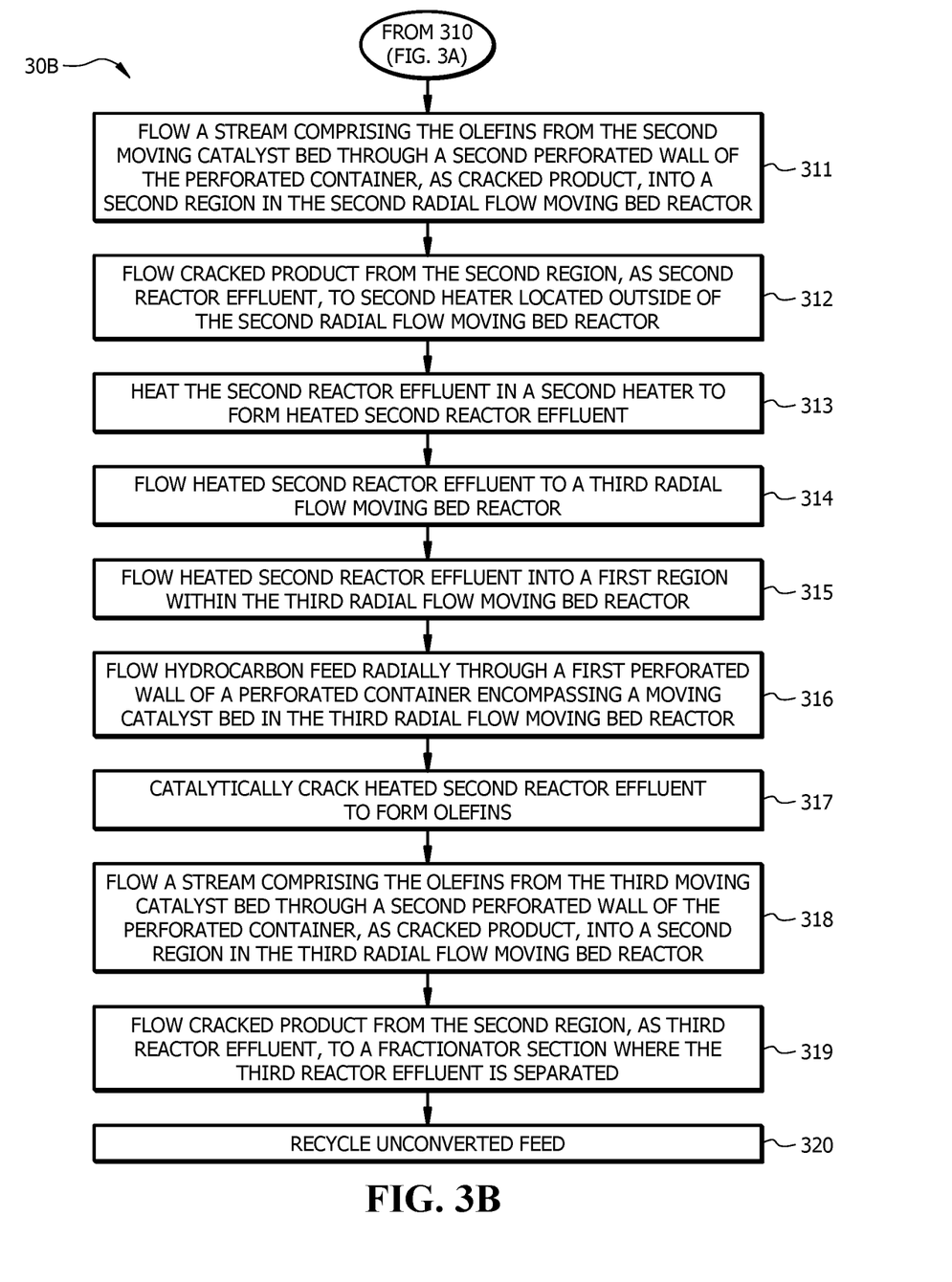

FIG. 1 shows multi-stage reactor system 10 for producing olefins, according to embodiments of the invention. FIG. 2A and FIG. 2B show radial flow moving bed reactors 20A and 20B, respectively, for producing olefins, according to embodiments of the invention. FIG. 3A and FIG. 3B show method 30 (shown as 30A and 30B) for producing olefins, according to embodiments of the invention. Method 30 may be implemented with multi-stage reactor system 10, comprising radial flow moving bed reactor RFMBR 20A and RFMBR 20B.

FIG. 1 shows multi-stage reactor system 10 having radial flow moving bed reactors $R_1$, $R_2$, and $R_3$ for the continuous catalytic cracking of hydrocarbons such as naphtha. According to embodiments of the invention, reactors $R_1$, $R_2$, and $R_3$ are radial flow moving bed reactors (RFMBRs). FIG. 2A and FIG. 2B show two designs of RFMBRs. FIG. 2A shows an inward radial flow reactor configuration where the feed flow enters to the catalysts from the shell side and FIG. 2B shows an outward radial flow reactor configuration where the feed flow enters from the reactor tube.

According to embodiments of the invention, method 30A may include, at block 300, providing a multi-stage reactor system such as multi-stage reactor system 10 for cracking paraffins of hydrocarbon feed 100.

FIG. 2A and FIG. 2B show details of the features of the RFMBRs used in method 30, according to embodiments of the invention, where radial flow moving bed reactors $R_1$, $R_2$, and $R_3$ can be implemented as any one of RFMBR 20A and/or RFMBR 20B. The catalyst beds in radial flow moving bed reactors $R_1$, $R_2$, and $R_3$ can be one type of catalyst compositions up to three different types of catalyst compositions.

FIG. 2A shows radial flow moving bed reactor 20A for producing olefins, according to embodiments of the invention and in the context of being used as an inward flowing radial flow moving bed reactor $R_1$. It should be noted that any combination of RFMBR 20A and RFMBR 20B can be used as the radial flow moving bed reactors (e.g., $R_1$, $R_2$, and $R_3$.) according to embodiments of the invention. RFMBR 20A includes shell 200A with inlet 206A for hydrocarbon feed 100, inlet 210A for sweep gas 103, outlet 208A for first reactor effluent 107, and one or more outlets 209A through which catalyst is removed from RFMBR 20A. Disposed within shell 200A is moving catalyst bed 204A, formed by flowing catalyst particles through catalyst inlets 205A at the upper portion of shell 200A so that the catalyst flows downward through perforated container 201A. Perforated container 201A, according to embodiments of the invention, is adapted so that it keeps the catalyst particles contained within perforated container 201A, while allowing hydrocarbon feed 100 to be able to flow into perforated container 201A and contact moving catalyst bed 204A. Thus, the perforations in walls 202A and 203A may be large enough to have sufficient flow of hydrocarbon feed 100 through, but small enough such that the catalyst particles are contained within perforated container 201A. Hydrocarbon feed 100 flows from inlet 206A to first region 212A and then through perforated wall 202A to enter and make contact with moving catalyst bed 204A. As a result of hydrocarbon feed 100 contacting moving catalyst bed 204A under reaction conditions in RFMBR 20A sufficient to crack paraffins in hydrocarbon feed 100, cracked product 110 comprising olefins is formed. According to embodiments of the invention, RFMBR 20A has region 207A at its center for receiving cracked product 110 from the moving catalyst bed 204A, as it exits perforated wall 203A. Sweep gas 103 can be fed into region 207A to sweep cracked product 110 up and through outlet 208A as first reactor effluent 107 for further processing. It should be noted that RFMBR 20A is adapted with channels such that the cracked product 110 does not contact hydrocarbon feed 100.

FIG. 2B shows radial flow moving bed reactor 20B for producing olefins, according to embodiments of the invention and in the context of being used as an outward flowing radial flow moving bed reactor $R_1$. RFMBR 20B can be used as any of the radial flow moving bed reactors (e.g., $R_1$, $R_2$, and $R_3$.), according to embodiments of the invention. RFMBR 20B includes shell 200B with inlet 208B for hydrocarbon feed 100, inlet 211B for sweep gas 103, outlet 206B for first reactor effluent 107, and one or more outlets 209B through which catalyst is removed from RFMBR 20B. Disposed within shell 200B is moving catalyst bed 204B, formed by flowing catalyst particles through catalyst inlets 205B at the upper portion of shell 200B so that the catalyst flows downward through perforated container 201B. Perforated container 201B, according to embodiments of the invention, is adapted so that it keeps the catalyst particles contained within perforated container 201B, while allowing hydrocarbon feed 100 to be able to flow into perforated container 201B and contact moving catalyst bed 204B. Thus, the perforations in walls 202B and 203B may be large enough to have sufficient flow of hydrocarbon feed 100 through, but small enough such that the catalyst particles are contained within perforated container 201B. Hydrocarbon feed 100 flows from third region 207B and then through perforated wall 203B to enter and make contact with moving catalyst bed 204B. As a result of hydrocarbon feed 100 contacting moving catalyst bed 204B under reaction conditions in RFMBR 20B sufficient to crack paraffins in hydrocarbon feed 100, cracked product 110 comprising olefins is formed. According to embodiments of the invention, RFMBR 20B has region 212B at its shell side for receiving cracked product 110 from the moving catalyst bed 204B, as it exits perforated wall 202B. Sweep gas 103 can be fed into region 212B to sweep cracked product 110 up and through outlet 206B as first reactor effluent 107 for further processing. It should be noted that RFMBR 20B is adapted with channels such that the cracked product 110 does not contact hydrocarbon feed 100.

Thus, block 300 may involve providing first radial flow moving bed reactor $R_1$ (e.g., RFMBR 20A and/or 20B), which comprises a shell and first moving catalyst bed 105 (e.g., moving catalysts beds 204A and/or 204B) within the shell of first radial flow moving bed reactor $R_1$. First catalyst bed 105 (e.g., moving catalysts beds 204A and/or 204B) of radial flow moving bed reactor $R_1$ is formed by flowing catalyst particles to an upper portion of a first perforated container (e.g., perforated container 201A or 201B) within the shell of first radial flow moving bed reactor $R_1$ so that the catalyst particles flow downward from the upper portion of the first perforated container, by gravity, to a lower portion of the first perforated container and then flow out of first radial flow moving bed reactor $R_1$ to catalyst regenerator 130.

Method 30, according to embodiments of the invention, include, at block 301, flowing, hydrocarbon feed 100 (e.g., a liquid hydrocarbon feed) into a first region (e.g., region 212A or region 207B) within radial flow moving bed reactor $R_1$. Hydrocarbon feed 100, in embodiments of the invention, can be straight run naphtha, kerosene, or diesel. Hydrocarbon feed 100 can be mixed with diluent stream 101 (water or dry gas) to form diluted hydrocarbon feed 102, according to embodiments of the invention at a ratio of diluent (e.g., water)/feed ratio of 0 to 10 and all ranges and values there between, including 0 to 1, 1 to 2, 2 to 3, 3 to 4, 4 to 5, 5 to 6, 6 to 7, 7 to 8, 8 to 9 and 9 to 10. According to embodiments of the invention, diluted hydrocarbon feed 102 may also comprise recycle naphtha stream 129. At block 302, in radial flow moving bed reactor $R_1$, diluted hydrocarbon feed 102 (including hydrocarbon feed 100) flows radially through a first wall of the first perforated container (e.g., perforated wall 202A or perforated wall 203B), then through the first moving catalyst bed (e.g., moving catalysts beds 204A or 204B). In this way, there is contact between the hydrocarbon feed 100 (as part of diluted hydrocarbon feed 102) with the first moving catalyst bed (e.g., moving catalysts beds 204A or 204B). According to embodiments of the invention, this contact causes catalytically cracking, at block 303, of hydrocarbon feed 100 under first reaction conditions sufficient to form olefins in first reactor effluent 107. The first reaction conditions may include one or more of: a temperature of 450 to 900° C. and all ranges and values there between, including 450 to 500° C., 500 to 550° C., 550 to 600° C., 600 to 650° C., 650 to 700° C., 700 to 750° C., 750 to 800° C., 800 to 850° C., and 850 to 900° C.; a pressure of 0.5 to 10 bar and all ranges and values there between including 0.5 to 1 bar, 1 to 2 bar, 2 to 3 bar, 3 to 4 bar, 4 to 5 bar, 5 to 6 bar, 6 to 7 bar, 7 to 8 bar, 8 to 9 bar, and 9 to 10 bar; and a WHSV of 1 to 15 $hr^{-1}$ and all ranges and values there between, including 1 to 3 $hr^{-1}$, 3 to 5 $h^{-1}$, 5 to 7 $h^{-1}$, 7 to 9 $h^{-1}$, 9 to 11 $h^{-1}$, 11 to 13 $h^{-1}$, and 13 to 15 $h^{-1}$, in embodiments of the invention.

Method 30, in embodiments of the invention, may include, at block 304, flowing a stream comprising the olefins from the first moving catalyst bed (e.g., moving catalyst bed 204A and 204B) through a second wall of the first perforated container (e.g., perforated wall 203A or 202B), as cracked product 110, into a second region within the shell (e.g., region 207A or region 212B).

At block 305, method 30 may involve flowing cracked product 110 from the second region within the first shell (e.g., region 207A or region 212B), as first reactor effluent 107, to first heater 108 located outside of radial flow moving bed reactor $R_1$. This may involve flowing sweep gas 103 through region 207A or region 212B upward to flow first reactor effluent 107 through, for example, outlet 208A or outlet 206B. According to embodiments of the invention, block 306 involves heating first reactor effluent 107 in first heater 108 to form heated first reactor effluent 109 at a temperature in a range of 580° C. to 750° C. Method 30 may continue at block 307, which includes flowing heated first reactor effluent 109 to radial flow moving bed reactor $R_2$, in embodiments of the invention.

According to embodiments of the invention, method 30 involves, at block 308, flowing, heated first reactor effluent 109 into a first region (e.g., region 212A or regions 207B) within radial flow moving bed reactor $R_2$. Heated first reactor effluent 109, in embodiments of the invention, comprises 5 wt. % to 20 wt. % light olefin. In radial flow moving bed reactor $R_2$, at block 309, heated first reactor effluent 109 flows radially through a first wall of a second perforated container (e.g., perforated wall 202A or perforated wall 203B), then through second moving catalyst bed 112 (e.g., moving catalysts beds 204A or 204B). In this way, there is contact between the heated first reactor effluent 109 with second moving catalyst bed 112 (e.g., moving catalysts beds 204A or 204B). According to embodiments of the invention, this contact causes catalytically cracking, at block 310, of heated first reactor effluent 109 (e.g., paraffins that remain uncracked from radial flow moving bed reactor $R_1$) under second reaction conditions sufficient to form additional olefins in second reactor effluent 114. The second reaction conditions may include one or more of: a temperature of 450 to 900° C., a pressure of 0.5 to 10 bar, and a WHSV of 1 to 15 $hr^{-1}$, in embodiments of the invention.

Method 30, in embodiments of the invention, may include, at block 311, flowing a stream comprising the olefins from the second moving catalyst bed (e.g., moving catalyst bed 204A and 204B) through a second wall of the second perforated container (e.g., perforated wall 203A or 202B), as cracked product, into a second region within the shell (e.g., region 207A or region 212B).

At block 312, method 30 may involve flowing cracked product from the second region within the first shell (e.g., region 207A or region 212B), as second reactor effluent 114, to second heater 115 located outside of radial flow moving bed reactor $R_2$. This may involve flowing sweep gas 103 through region 207A or region 212B upward to flow second reactor effluent 114 through, for example, outlet 208A or outlet 206B. According to embodiments of the invention, block 313 involves heating second reactor effluent 114 in second heater 115 to form heated second reactor effluent 116 at a temperature in a range of 580° C. to 750° C. Method 30 may continue at block 314, which includes flowing heated second reactor effluent 116 to radial flow moving bed reactor $R_3$, in embodiments of the invention.

According to embodiments of the invention, method 30 involves, at block 315, flowing heated second reactor effluent 116 into a first region (e.g., region 212A or regions 207B) within radial flow moving bed reactor $R_3$. Heated second reactor effluent 116, in embodiments of the invention, comprises 10 wt. % to 35 wt. % light olefins. In radial flow moving bed reactor $R_3$, at block 316, heated second reactor effluent 116 flows radially through a first wall of a third perforated container (e.g., perforated wall 202A or perforated wall 203B), then through third moving catalyst bed 119 (e.g., moving catalysts beds 204A or 204B). In this way, there is contact between the heated second reactor effluent 116 with third moving catalyst bed 119 (e.g., moving catalysts beds 204A or 204B). According to embodiments of the invention, this contact causes catalytically cracking, at block 317, of heated second reactor effluent 116 (e.g., paraffins that remain uncracked from radial flow moving bed reactor $R_2$) under third reaction conditions sufficient to form additional olefins in third reactor effluent 121. The third reaction conditions may include one or more of: a temperature of 450 to 900° C., a pressure of 0.5 to 10 bar, and a WHSV of 1 to 15 hr$^{-1}$, in embodiments of the invention.

Method 30, in embodiments of the invention, may include, at block 318, flowing a stream comprising the olefins from the third moving catalyst bed (e.g., moving catalyst bed 204A and 204B) through a second wall of the third perforated container (e.g., perforated wall 203A or 202B), as cracked product, into a second region within the shell (e.g., region 207A or region 212B).

According to embodiments of the invention, third reactor effluent 121 comprises 25 wt. % to 50 wt. % light olefins. Third reactor effluent 121 can be separated into target components using a series of separation equipment (fractionator section 122). Fractionator section 122 may comprise a distillation column, gas dryer, cold box, cooling tower, acid and base wash, vessels and separators or combinations thereof. At block 319, in embodiments of the invention, third reactor effluent 121 is separated in fractionation section 122 to produce stream 123 comprising primarily $C_2$ to $C_4$ olefins, stream 124 comprising primarily light naphthas, stream 125 comprising primarily a pygas stream, stream 126 (bottom) comprising primarily fuel oil type product. In embodiments of the invention, unconverted feed can be recycled back with fresh feed to the reactors for further conversion. Thus, as shown in FIG. 1, in embodiments of the invention, at block 320, a portion of stream 124 (stream 127) and a portion of stream 125 (stream 128) are recycled to feed into radial flow moving bed reactor $R_1$, for example, as recycle naphtha stream 129 to be a part of diluted hydrocarbon feed 102.

Method 30, in embodiments of the invention can involve routing spent catalyst 131 form radial flow moving bed reactors $R_1$, $R_2$, and $R_3$ to regenerator 130 where an oxidant such as air stream 132 is flowed through spent catalyst at a temperature of 40° C. to 300° C. in regenerator 130 to burn off coke and produce regenerated catalyst 133 and flue gas 134. In embodiments of the invention, regenerated catalyst 133 and fresh catalyst 144 may be combined to form combined fresh and regenerated catalyst 145. In embodiments of the invention, multi-stage reactor system 10 may include a catalyst regenerator unit comprising one or more regenerators and may be able to regenerate different types of catalysts used in radial flow moving bed reactors $R_1$, $R_2$, and $R_3$. According to embodiments of the invention, combined fresh and regenerated catalyst 145 is routed to radial flow moving bed reactors $R_1$, $R_2$, and $R_3$ with or without fresh catalyst being added via route 104, route 111, and route 118, respectively.

Multi-stage reactor system 10 is shown in FIG. 1 as having three consecutive RFMBR reactors, but embodiments of the invention is not limited to three RFMBR reactors, as more than three reactors may be used (e.g., 4, 5, 6, 7, and 8). The RFMBR reactors, in embodiments of the invention can be arranged either in parallel and/or consecutive sequences to obtain better yield. Inter-stage heaters (first heater 108 and second heater 115) are used to heat the feed and effluent between the reactors.

As demonstrated by multi stage reactor system 10 and method 30, the catalytic cracking reactions are conducted in one stage or more wherein the stages includes a radial flow moving-bed reactor system with continual catalyst regeneration. The catalyst is moving slowly, driven by gravity, from the top toward the bottom of the reactor, and then the drawn out deactivated catalyst is sent to a regenerator for coke burn off. The hydrocarbons are heated in the inter-stage heaters to increase the temperature so that conversion can increase. In this moving bed process, the catalyst moves very slow. Hence, the moving bed behaves in each point of the reactor as a fixed bed. According to embodiments of the invention, this radial flow moving bed technology provides high production capacity without increased pressure drop or increased vessel size while the catalyst remains at an acceptable activity level, by continuous catalyst renewal.

Although embodiments of the present invention have been described with reference to blocks of FIG. 3A and FIG. 3B, it should be appreciated that operation of the present invention is not limited to the particular blocks and/or the particular order of the blocks illustrated in FIG. 3A and FIG. 3B. Accordingly, embodiments of the invention may provide functionality as described herein using various blocks in a sequence different than that of FIG. 3A and FIG. 3B.

EXAMPLES

As part of the disclosure of the present invention, specific examples are included below. The examples are for illustrative purposes only and are not intended to limit the invention. Those of ordinary skill in the art will readily recognize parameters that can be changed or modified to yield essentially the same results.

Example 1

Figure 4:
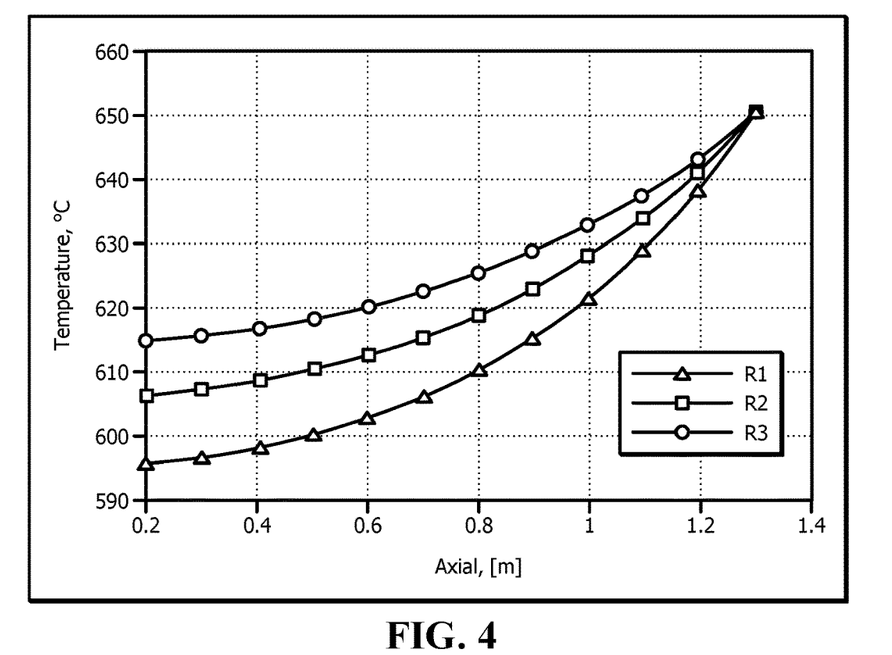
FIG. 4 is a graph showing the temperature profile along the axial direction in a mathematical model for an inward flow moving bed reactor system according to embodiments of the invention.
Figure 5:
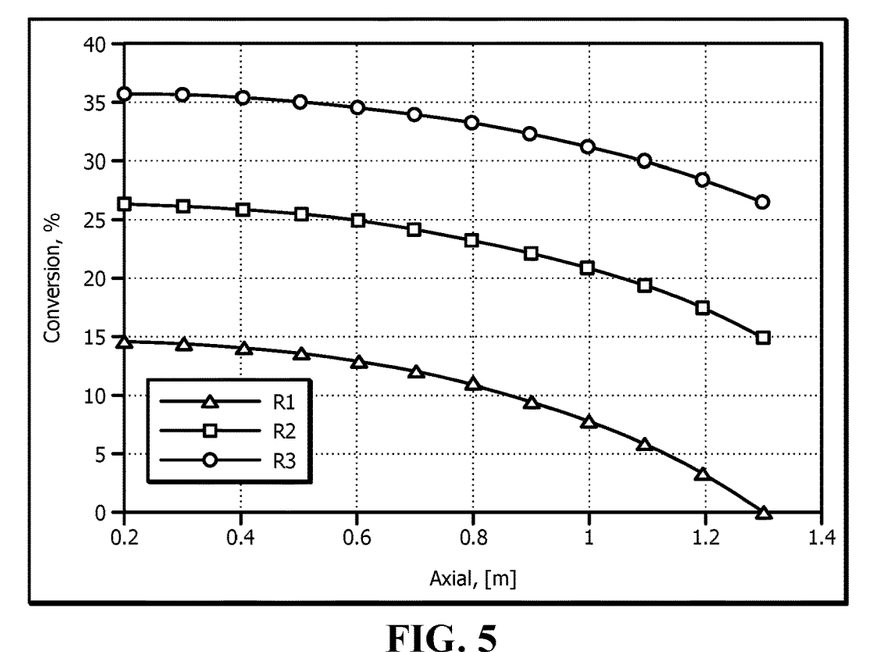
FIG. 5 is a graph showing the conversion percentage profile along the axial direction in a mathematical model for an inward flow moving bed reactor system according to embodiments of the invention.
Figure 6:
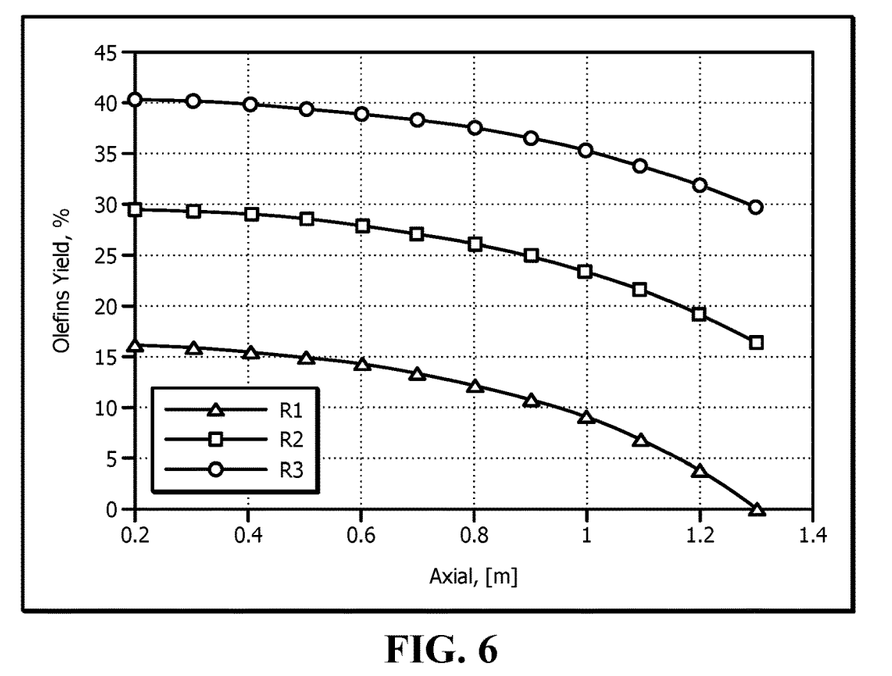
FIG. 6 is a graph showing the olefins yield profile along the axial direction in a mathematical model for an inward flow moving bed reactor system according to embodiments of the invention.

A mathematical model for inward flow moving bed reactor system as shown in FIG. 1 equipped with reactor configurations as shown in FIG. 2A with proper kinetic has been developed to simulate the conversion and products distributions of naphtha cracking to olefins. Table 1 shows the naphtha composition used in the simulation. FIG. 4, FIG. 5, and FIG. 6 show the temperature, conversion and olefins yield profiles along the axial direction.

TABLE 1

| light Naphtha composition Feed (LSRN) | |
| --- | --- |
| N-C5 | 28.7 |
| I-C5 | 11.8 |
| Cycl-C5 | 1.9 |
| N-C6 | 24.5 |
| I-C6 | 26.9 |
| Cycl-C6 | 4.6 |
| Benzene | 1.3 |
| C7 | 0.3 |
| sum | 100 |

Example 2

Figure 7:
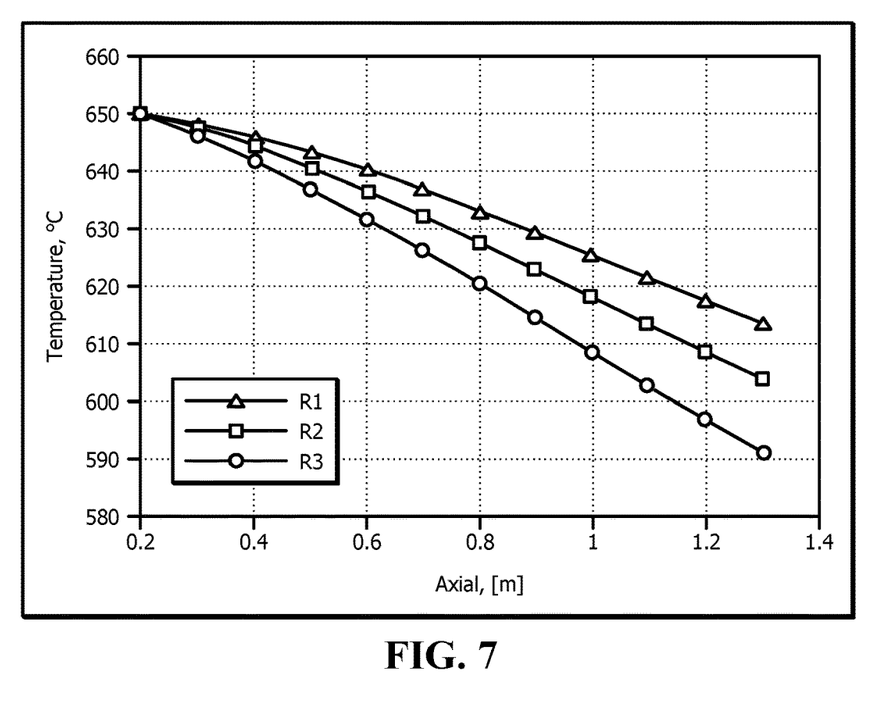
FIG. 7 is a graph showing the temperature profile along the axial direction in a mathematical model for an outward flow moving bed reactor system according to embodiments of the invention.
Figure 8:
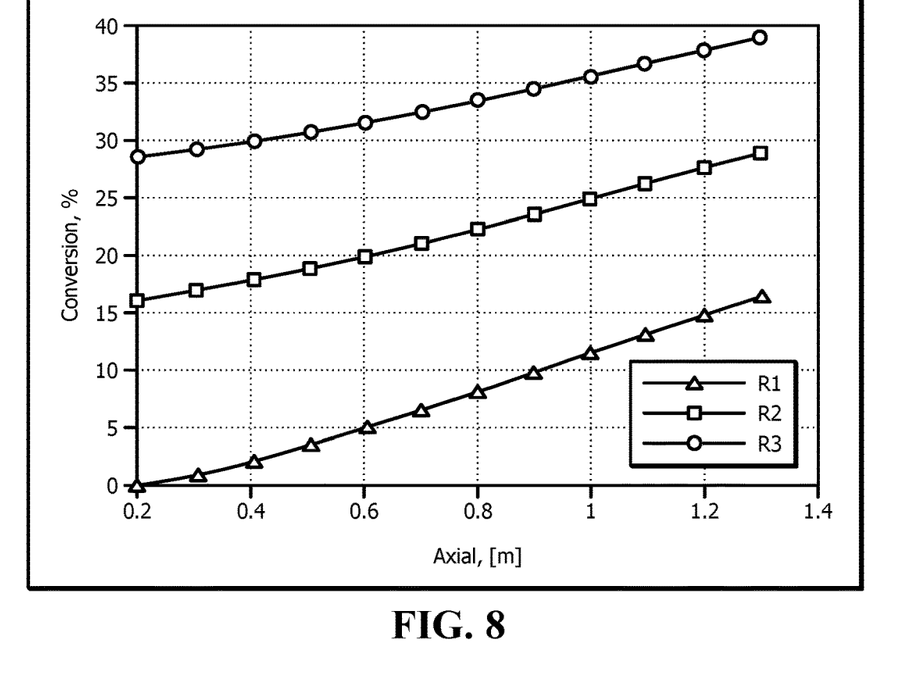
FIG. 8 is a graph showing the conversion percentage profile along the axial direction in a mathematical model for an outward flow moving bed reactor system according to embodiments of the invention.
Figure 9:
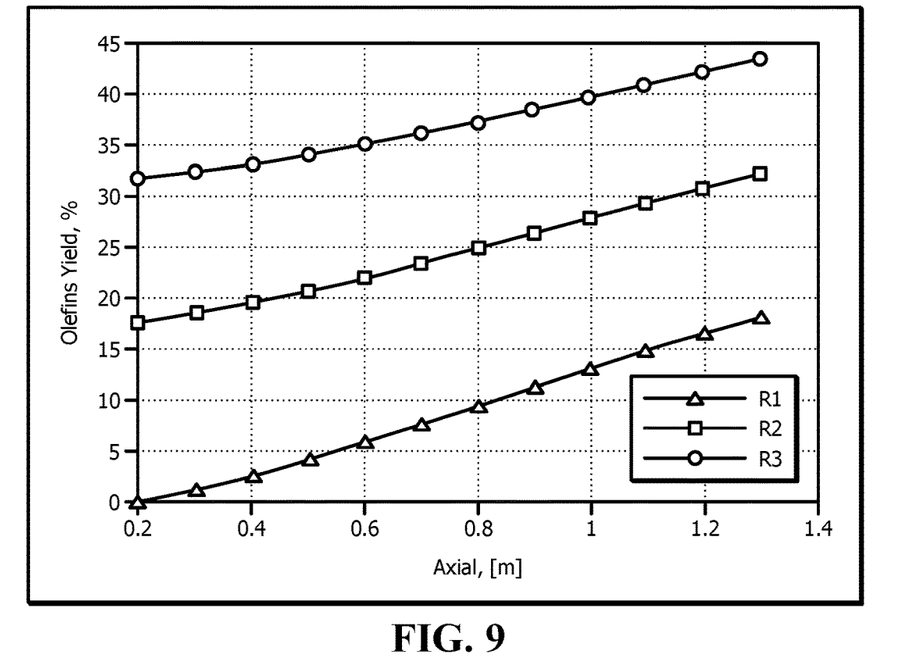
FIG. 9 is a graph showing the olefins yield profile along the axial direction in a mathematical model for an inward flow moving bed reactor system according to embodiments of the invention.

A mathematical model for outward flow moving bed reactor system as shown in FIG. 1 equipped with reactor configurations as shown in FIG. 2B with proper kinetic has been developed to simulate the conversion and products distributions of naphtha cracking to olefins. Table 1 shows the naphtha composition used in the simulation. FIG. 7, FIG. 8, and FIG. 9 show the temperature, conversion and olefins yield profiles along the axial direction.

In the context of the present invention, embodiments 1-20 are described. Embodiment 1 is a method of producing olefins. The method includes providing a first reactor that comprises a shell and a first moving catalyst bed within the shell of the first reactor, where a first catalyst bed of the first moving catalyst bed is formed by flowing first catalyst particles to an upper portion of a first perforated container within the shell of the first reactor so that the first catalyst particles flow downward from the upper portion of the first perforated container, by gravity, to a lower portion of the first perforated container and then flow out of the first reactor to a catalyst regenerator unit. The method also includes flowing a liquid hydrocarbon feed into a first region within the first reactor, from which the liquid hydrocarbon feed flows radially through a first section of the first perforated container, then through the first moving catalyst bed, thereby providing contact of the liquid hydrocarbon feed with the first catalyst particles of the first moving catalyst bed, and as a result of the contact, catalytically cracking the liquid hydrocarbon feed under first reaction conditions sufficient to form olefins. The method further includes flowing a stream comprising the olefins from the first moving catalyst bed through a second section of the first perforated container and into a second region within the shell. In addition, the method includes flowing a first effluent from the second region within the shell to a first heater located outside of the first reactor, then heating the first effluent in the first heater and flowing the heated first effluent to a second reactor. The method further includes catalytically cracking the heated first effluent in the second reactor under second reaction conditions sufficient to form additional olefins. Embodiment 2 is the method of embodiment 1, wherein the first catalyst particles in the first reactor and second catalyst particles in the second reactor have the same catalytic composition. Embodiment 3 is the method of embodiment 1, wherein the first catalyst particles in the first reactor and second catalyst particles in the second reactor have different catalytic composition. Embodiment 4 is the method of embodiment 3 wherein the catalyst regenerator unit includes a first regenerator for regenerating the first catalyst particles and a second regenerator for regenerating the second catalyst particles. Embodiment 5 is the method of any of embodiments 1 to 4, further including flowing a second effluent from the second reactor to a second heater and heating the second effluent from the second reactor to a desired temperature to form a heated effluent, then flowing the heated second effluent to a third reactor, and catalytically cracking the heated second effluent in the third reactor under third reaction conditions sufficient to form further olefins. Embodiment 6 is the method of any of embodiments 1 to 5, wherein the first reaction conditions, the second reaction conditions, and/or the third reaction conditions comprises a temperature of 450 to 900° C., a pressure of 0.5 to 10 bar, and a WHSV of 1 to 15 $hr^{-1}$. Embodiment 7 is the method of any of embodiments wherein the liquid hydrocarbon feed contains naphtha. Embodiment 8 is the method of any of embodiments, wherein the liquid hydrocarbon feed contains $C_5$ and $C_7$ hydrocarbons. Embodiment 9 is the method of any of embodiments, wherein the liquid hydrocarbon feed has an end point of less than 350° C. Embodiment 10 is the method of any of embodiments, wherein the liquid hydrocarbon feed contains paraffins, iso-paraffins, olefins, iso-olefins, and naphthene. Embodiment 11 is the method of any of embodiments 1 to 10, further including feeding a diluent comprising water, dry gas, or combinations thereof to the first reactor with the liquid hydrocarbon feed. Embodiment 12 is the method of embodiment 11 wherein the ratio of the diluent to the liquid hydrocarbon feed is 0.1 to 10.

Embodiment 13 is a multi-stage reactor system. The system includes a catalyst regenerator system and a first reactor that includes a shell, an inlet adapted to receive a liquid hydrocarbon feed, a first inlet adapted to receive first catalyst particles, a first perforated container within the shell of the first reactor, wherein the inlet adapted to receive the first catalyst particles leads to an upper portion of the first perforated container, a first region adjacent a first perforated wall of the first perforated container and a second region adjacent a second perforated wall of the first perforated container. The first reactor also includes a first moving catalyst bed within the first perforated container, wherein the inlet adapted to receive the liquid hydrocarbon feed leads into the first region such that the liquid hydrocarbon feed flows radially through the first perforated wall of the first perforated container into the first moving catalyst bed, and then cracked product flows through the second wall of the first perforated container into the second region. In addition, the first reactor includes an outlet adapted to allow flow of the cracked product from the second region to outside the shell, and an outlet adapted to receive the first catalyst particles from a lower portion of the first perforated container as the first catalyst particles flow downward from the upper portion of the first perforated container, by gravity. The system also includes a first connector connecting the outlet adapted to receive the first catalyst particles from the lower portion of the first perforated container to an inlet of the catalyst regenerator system, a first heater, a second reactor, a second connector adapted to provide fluid communication between the outlet adapted to allow the flow of cracked product from the second region and the first heater, and a third connector adapted to provide fluid communication between the first heater and the second reactor. Embodiment 14 is the multi-stage reactor system of embodiment 13, wherein the first catalyst includes zeolite components having topologies of MFI, Beta, FER, MOR and zeolite Y, filler, binder, and matrix, or combinations thereof. The zeolites can be parent or post-modified zeolite by methods known to a person skilled in the art. Embodiment 15 is the multi-stage reactor system of either of embodiments 13 or 14, wherein the second reactor includes a second shell, an inlet adapted to receive cracked product from the first heater, a second inlet adapted to receive second catalyst particles, and a second perforated container within the shell of the second reactor, wherein the second inlet adapted to receive second catalyst particles leads to an upper portion of the second perforated container. The second reactor also includes a third region, which is adjacent a first perforated wall of the second perforated container and a fourth region, which is adjacent a second perforated wall of the second perforated container, a second moving catalyst bed within the second perforated container, wherein the inlet adapted to receive cracked product from the first heater leads into the third region such that the cracked product flows radially through the first perforated wall of the second perforated container into the second moving catalyst bed, and then twice cracked product flows through the second wall of the second perforated container into the fourth region, an outlet adapted to allow flow of the cracked product from the second region to outside the shell, and an outlet adapted to receive the second catalyst particles from a lower portion of the second perforated container as the second catalyst particles flow downward from the upper portion of the second perforated container, by gravity. The second reactor further includes a third connector connecting the outlet adapted to receive second catalyst particles from the lower portion of the second perforated container to an inlet of the catalyst regenerator system, a second heater, a third reactor, a fourth connector adapted to provide fluid communication between the outlet adapted to allow flow of twice cracked product from the fourth region and the first heater, and a fifth connector adapted to provide fluid communication between the second heater and the third reactor. Embodiment 16 is the multi-stage reactor system of embodiment 15, wherein the second catalyst particles include zeolite components having topologies of MFI, Beta, FER, MOR and zeolite Y, filler, binder, and matrix, or combinations thereof. The zeolites can be parent or post-modified zeolite by methods known to a person skilled in the art. In addition, the catalyst in the next stage reactor system may have the same or different catalyst composition (catalyst type, silica/alumina ratio) from the previous reactor system. Embodiment 17 is multi-stage reactor system of either of embodiments 15 or 16, wherein the first catalyst particles and the second catalyst particles have the same catalytic composition. Embodiment 18 is the multi-stage reactor system of embodiment 17, wherein the catalyst regenerator unit is adapted to regenerate the first catalyst particles and the second catalyst particles together. Embodiment 19 is the multi-stage reactor system of either of embodiments 15 or 16, wherein catalytic composition of the first catalyst particles is different from catalytic composition of the second catalyst particles. Embodiment 20 is the multi-stage reactor system of claim 19, wherein the catalyst regenerator system includes a first catalyst regenerator for regenerating the first catalyst particles and a second catalyst regenerator for regenerating the second catalyst particles.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of producing olefins; the method comprising:
providing a first reactor that comprises a shell and a first moving catalyst bed within the shell of the first reactor, a first catalyst bed of the first moving catalyst bed is formed by flowing first catalyst particles to an upper portion of a first perforated container within the shell of the first reactor so that the first catalyst particles flow downward from the upper portion of the first perforated container, by gravity, to a lower portion of the first perforated container and then flow out of the first reactor to a catalyst regenerator unit;
flowing a liquid hydrocarbon feed into a first region within the first reactor, from which the liquid hydrocarbon feed flows radially through a first section of the first perforated container, then through the first moving catalyst bed, thereby providing contact of the liquid hydrocarbon feed with the first catalyst particles of the first moving catalyst bed;
as a result of the contact, catalytically cracking the liquid hydrocarbon feed under first reaction conditions sufficient to form olefins;
flowing a stream comprising the olefins from the first moving catalyst bed through a second section of the first perforated container and into a second region within the shell;
flowing a first effluent from the second region within the shell to a first heater located outside of the first reactor;
heating the first effluent in the first heater;
flowing the heated first effluent to a second reactor; and
catalytically cracking the heated first effluent in the second reactor under second reaction conditions sufficient to form additional olefins;
feeding a diluent comprising water, dry gas, or combinations thereof to the first reactor with the liquid hydrocarbon feed;
wherein the first reactor and the second reactor are redial flow moving bed reactors;
wherein the first catalyst particles comprise a zeolite component having a topology of one or more of FER and MOR;
wherein the ratio of the diluent to the liquid hydrocarbon feed is 10; and
wherein the liquid hydrocarbon feed comprises olefins, iso-olefins, and naphthene.

2. The method of claim 1, wherein the first catalyst particles in the first reactor and second catalyst particles in the second reactor have the same catalytic composition.

3. The method of claim 1, wherein the first catalyst particles in the first reactor and second catalyst particles in the second reactor have different catalytic composition.

4. The method of claim 3 wherein the catalyst regenerator unit comprises a first regenerator for regenerating the first catalyst particles and a second regenerator for regenerating the second catalyst particles.

5. The method of claim 1, wherein the liquid hydrocarbon feed comprises $C_5$ and $C_7$ hydrocarbons.

6. The method of claim 1, wherein the wherein the first catalyst particles comprise a zeolite component having a topology of one or more of MOR.

7. A method of producing olefins; the method comprising:
providing a first reactor that comprises a shell and a first moving catalyst bed within the shell of the first reactor, a first catalyst bed of the first moving catalyst bed is formed by flowing first catalyst particles to an upper portion of a first perforated container within the shell of the first reactor so that the first catalyst particles flow downward from the upper portion of the first perforated container, by gravity, to a lower portion of the first perforated container and then flow out of the first reactor to a catalyst regenerator unit;
flowing a liquid hydrocarbon feed into a first region within the first reactor, from which the liquid hydrocarbon feed flows radially through a first section of the first perforated container, then through the first moving catalyst bed, thereby providing contact of the liquid hydrocarbon feed with the first catalyst particles of the first moving catalyst bed;
as a result of the contact, catalytically cracking the liquid hydrocarbon feed under first reaction conditions sufficient to form olefins;

flowing a stream comprising the olefins from the first moving catalyst bed through a second section of the first perforated container and into a second region within the shell;
flowing a first effluent from the second region within the shell to a first heater located outside of the first reactor;
heating the first effluent in the first heater;
flowing the heated first effluent to a second reactor; and
catalytically cracking the heated first effluent in the second reactor under second reaction conditions sufficient to form additional olefins;
flowing a second effluent from the second reactor to a second heater;
heating the second effluent from the second reactor to a desired temperature to form a heated effluent;
flowing the heated second effluent to a third reactor; and
catalytically cracking the heated second effluent in the third reactor under third reaction conditions sufficient to form further olefins;
wherein the first reactor and the second reactor are redial flow moving bed reactors;
wherein the first catalyst particles comprise a zeolite component having a topology of one or more of FER and MOR; and
wherein the first reaction conditions, the second reaction conditions, and/or the third reaction conditions comprises a temperature of 750 to 900° C., a pressure of 0.5 to 10 bar, and a WHSV of 1 to 15 $hr^{-1}$.

8. The method of claim 7, wherein the first reaction conditions, the second reaction conditions, and/or the third reaction conditions comprises a temperature of 900° C.

\* \* \* \* \*

UNITED STATES PATENT AND TRADEMARK OFFICE
CERTIFICATE OF CORRECTION

PATENT NO. : 11,905,467 B2
APPLICATION NO. : 17/267576
DATED : February 20, 2024
INVENTOR(S) : Abdulaziz A. Alarifi et al.

It is certified that error appears in the above-identified patent and that said Letters Patent is hereby corrected as shown below:

In the Claims

At Column 14, Claim number 1, Line number 22, delete "redial" and replace with --radial--.
At Column 15, Claim number 7, Line number 20, delete "redial" and replace with --radial--.

Signed and Sealed this
Second Day of April, 2024

Katherine Kelly Vidal
*Director of the United States Patent and Trademark Office*